US011378970B2

(12) United States Patent
Tatsubori et al.

(10) Patent No.: US 11,378,970 B2
(45) Date of Patent: Jul. 5, 2022

(54) VISUAL LOCALIZATION SUPPORT SYSTEM

(71) Applicant: INTERNATIONAL BUSINESS MACHINES CORPORATION, Armonk, NY (US)

(72) Inventors: Michiaki Tatsubori, Oiso (JP); Phongtharin Vinayavekhin, Taito-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 585 days.

(21) Appl. No.: 16/268,135

(22) Filed: Feb. 5, 2019

(65) Prior Publication Data

US 2020/0249689 A1 Aug. 6, 2020

(51) Int. Cl.
*G06K 9/00* (2022.01)
*G05D 1/02* (2020.01)
*G06K 19/06* (2006.01)
*G08G 1/09* (2006.01)
*G05D 1/00* (2006.01)
(Continued)

(52) U.S. Cl.
CPC ............ *G05D 1/0234* (2013.01); *E01F 9/00* (2013.01); *G05D 1/0088* (2013.01); *G05D 1/0278* (2013.01); *G06K 19/06037* (2013.01); *G06K 19/06056* (2013.01); *G06K 19/06065* (2013.01); *G06T 3/0006* (2013.01); *G08G 1/092* (2013.01); *G08G 1/09623* (2013.01); *B32B 2590/00* (2013.01); *G05D 2201/0213* (2013.01);
(Continued)

(58) Field of Classification Search
CPC .. G05D 1/0234; G05D 1/0088; G05D 1/0278; G05D 2201/0213; E01F 9/00; G06K 19/06037; G06K 19/06056; G06K 19/06065; G06T 3/0006; G06T 2207/30256; G08G 1/092; G08G 1/09623; B32B 2590/00; Y10S 260/99819
See application file for complete search history.

(56) References Cited

U.S. PATENT DOCUMENTS 5,774,824 A 6/1998 Streit et al.
7,969,558 B2 6/2011 Hall
(Continued)

FOREIGN PATENT DOCUMENTS

CN 103631264 A 3/2014
CN 105737832 A 3/2016

OTHER PUBLICATIONS

Kawamata, Shota, et al. "Location detection system by an on-board slit camera imaging road surface marks and its application." Proceedings. The IEEE 5th International Conference on Intelligent Transportation Systems. IEEE, 2002. (Year: 2002).*
(Continued)

*Primary Examiner* — Avinash Yentrapati
(74) *Attorney, Agent, or Firm* — Tutunjian & Bitetto, P.C.; Randall Bluestone

(57) ABSTRACT

A visual localization support system is provided. The visual localization support system includes one or more guidance indicators place on a road surface of a roadway, wherein the one or more guidance indicators each include a matrix barcode that uniquely identifies a location by latitude, longitude, and altitude, and describes an affine shape of the guidance indicator.

15 Claims, 9 Drawing Sheets

(51) Int. Cl.
*G08G 1/0962* (2006.01)
*G06T 3/00* (2006.01)
*E01F 9/00* (2016.01)

(52) U.S. Cl.
CPC .............. *G06T 2207/30256* (2013.01); *Y10S 260/99819* (2013.01)

(56) References Cited

U.S. PATENT DOCUMENTS

| | | | | |
|---|---|---|---|---|
| 10,068,133 | B2* | 9/2018 | Akselrod | G06V 20/20 |
| 10,217,357 | B1* | 2/2019 | Elsheemy | B60Q 9/00 |
| 2005/0285761 | A1* | 12/2005 | Jancke | G06K 19/06037 |
| | | | | 341/50 |
| 2008/0048044 | A1* | 2/2008 | Zhao | G06K 7/1417 |
| | | | | 235/494 |
| 2010/0020306 | A1 | 1/2010 | Hall | |
| 2010/0121561 | A1* | 5/2010 | Kodaira | G06V 20/588 |
| | | | | 382/104 |
| 2010/0328054 | A1* | 12/2010 | Yim | G01C 21/3602 |
| | | | | 340/425.5 |
| 2013/0161395 | A1* | 6/2013 | Tian | G06K 19/0614 |
| | | | | 235/494 |
| 2016/0180177 | A1* | 6/2016 | Nguyen | G06T 7/143 |
| | | | | 382/104 |
| 2017/0358204 | A1* | 12/2017 | Modica | G08G 1/0141 |
| 2018/0282955 | A1* | 10/2018 | McClendon | G06V 20/588 |
| 2019/0163197 | A1* | 5/2019 | Qiao | G01C 21/00 |
| 2019/0390974 | A1* | 12/2019 | Alqudah | G01C 21/3691 |
| 2021/0039669 | A1* | 2/2021 | Watson | G08G 1/09623 |

OTHER PUBLICATIONS

Ozan, Erol. "QR Code Based Signage to Support Automated Driving Systems on Rural Area Roads." International Joint conference on Industrial Engineering and Operations Management. Springer, Cham, 2018. (Year: 2018).*

Haklay et al., "OpenStreetMap: User-Generated street Maps", IEEE CS. www.computer.org/pervasive computing. 2008 vol. 7, Issue No. 4. Oct.-Dec. 2008. pp. 12-18.

Brange et al., "Managed Model Based 3D Engineering". White Paper. Development of ISO 10303 Step AP 242 ed2—Version 1.0. Mar. 30, 2014. pp. 1-53.

* cited by examiner

VISUAL LOCALIZATION SUPPORT SYSTEM

BACKGROUND

Technical Field

The present invention generally relates to visual localization support systems, and more particularly to driving assistance systems with simultaneous localization and mapping (SLAM).

Description of the Related Art

In robotic mapping and navigation, simultaneous localization and mapping (SLAM) is the computational problem of constructing or updating a map of an unknown environment while simultaneously keeping track of an agent's location within it.

A Geographic Information System (GIS) is a specific type of mapping technology that allows you to layer data tied to geographic points. A data element that can be tied to a latitude and longitude can be mapped (i.e., associated with that geographic point). Satellite and aerial imagery can be used as a starting point for high definition (HD) maps.

Driving assistance systems with simultaneous localization and mapping (SLAM) with sensors/cameras need highly detailed and semantically-defined (HDSD) maps. The maps that are particularly built for self-driving purposes can be referred to as high definition/highly detailed (HD) maps. These maps specifically have extremely high precision that can be at centimeter-level. Autonomous cars require maps that are high definition and highly detailed that can tell them where the curb is within a few centimeters.

"Semantic" can be a general term for any information computer programs can understand and process. The HDSD maps can include information with well-defined meaning to better enable computers to understand objects, such as traffic rules for road ways/lanes, traffic signs and traffic signals that have to be obeyed, obstructions, hazards, points of interest, etc., embedded in the map, provided by other people and/or computers. Autonomous cars require maps that are live, updated second by second with information about accidents, traffic backups, and lane closures. The integration of static, temporary, and dynamic information in a geographical context is involved in the understanding and processing of complex traffic scenes. Driving assistance systems can have access to structured collections of information and sets of inference rules that can be used to conduct automated reasoning. An ontology can be a document or file that formally defines the relations among terms. The ontology can have a taxonomy and a set of inference rules. The taxonomy defines classes of objects and relations among them. An ontology may express rules of equivalence relations, where A=B, and transitive relationships, where if A=B and B=C, A=C.

SUMMARY

In accordance with an embodiment of the present invention, a visual localization support system is provided. The visual localization support system includes one or more guidance indicators placed on a road surface of a roadway, wherein the one or more guidance indicators each include a matrix barcode that uniquely identifies a location by latitude, longitude, and altitude, and describes an affine shape of the guidance indicator.

In accordance with another embodiment of the present invention, a method of forming a visual localization support system is provided. The method includes placing one or more guidance indicators on a road surface, wherein the one or more guidance indicators include a matrix barcode that uniquely identify a location by latitude, longitude, and altitude, and describes an affine shape of the guidance indicator.

In accordance with yet another embodiment of the present invention, a road map system is provided. The road map system includes a camera and an autonomous driving system in electronic communication with the camera, wherein the camera is configured to capture one or more images of a guidance indicator, and the autonomous driving system interprets the image of the guidance indicator to determine the location of the guidance indicator.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
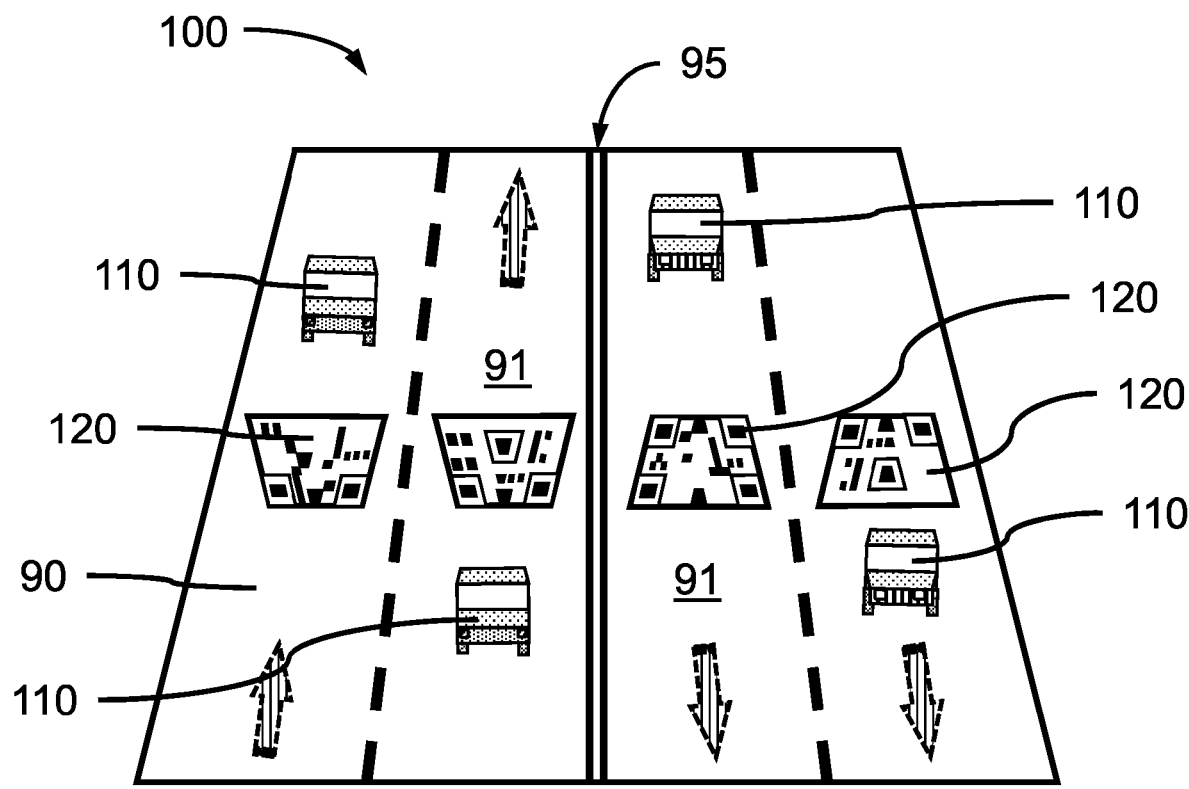
FIG. 1 is a perspective view showing a plurality of guidance indicators on the road surface of a multi-lane road, in accordance with an embodiment of the present invention.

Embodiments of the present invention provide a visual localization support system for driving assistance systems, where a graphic containing a matrix barcode can be placed on a roadway or other observable surface to uniquely identify an exact location. The driving assistance system can interpret the graphic to identify the location of a vehicle, where the graphic can be integrated into a map.

Embodiments of the present invention provide a visual localization support system having a graphic containing a matrix barcode placed on or along a roadway at accurately known, predetermined locations, where the matrix barcodes identify the high definition coordinates (i.e., much more accurate than a GPS coordinate location) of the specific location. A driving assistance system can use the high definition coordinates to specifically place a vehicle at a location on one or maps (e.g., a highly detailed and semantically-defined (HDSD) map, a GIS map, etc.) such that the high definition coordinates can also pin multiple maps (e.g., local and global) together at the reference high definition coordinates of the graphic containing the matrix barcode. A vehicle with a road map system can identify its absolute position much more accurately (e.g., ~1 meter (m) deviation with 68% confidence) compared to GPS (5-50 m deviation with 68% confidence). In various embodiments, placement of multiple graphics of the visual localization support system can provide lane detection and differentiation, as well as precise control points for navigating difficult intersections and road paths. In various embodiments, an HD mapping can be a 1:1 mapping of the roadway and terrain purposefully built for robotic systems, since autonomous driving systems can involve very precise instructions on how to maneuver a vehicle around a 3D space.

Embodiments of the present invention provide a visual localization support system having a graphic, referred to as a guidance indicator, containing a matrix barcode with encoded absolute position (longitude, latitude, and altitude, as well as a 3D affine transformation (or orientation and scale) from the unit size (e.g., 1 meter) and orientation (e.g., North)), where the encoded absolute position and 3D affine transformation provide a machine readable graphic that can be read by a camera in a moving vehicle. A 3D affine transformation is a linear mapping method that preserves points, straight lines, and planes, such that parallel lines remain parallel after an affine transformation. An affine transformation technique can be used to correct for geometric distortions or deformations that occur with non-ideal camera angles. The affine transformation can use a suitable transformation matrix for the transformation to be performed. An image can have an affine shape after an affine transformation is applied to the original shape. For example, a square object can have a parallelogram or trapezoidal affine shape after undergoing the associated affine transformation. In various embodiments, the matrix of the affine transformation applied to a graphic of the visual localization support system can be encoded in the graphic to allow a camera reading the graphic to know how the shape has been altered from the original shape.

Embodiments of the present invention provide an in-vehicle computing device with a camera that searches such captured images for the graphic (guidance indicator) for resolving the absolute positions of the 3D objects the systems's/vehicle's cameras and other sensors detected, to (1) scan a matrix barcode (e.g., quick response code (QR Code®)) in the camera images and read the position information encoded in the matrix barcode, (2) generate the expected 3D model of the graphic of the matrix barcode (e.g., QR code) and search a reasonable (camera) projection (perspective warp) of the 3D model into the image to calculate relative position(s) of the guidance indicator to the vehicle (thus the relative vehicle position to the absolute graphic position), (3) resolve the absolute positions of the 3D objects around the guidance indicator (e.g., QR code) based on their relative positions to the vehicle and the absolute positions of the vehicle, and (4) optionally report the measured positions of such QR code graphics relative to each other to a central server for potential correction of the absolute positions associated with each of the graphics. The server can provide an updated position of a guidance indicator (e.g., QR code) if queried with the position information, while maintaining its change, where the position can be recorded or updated in a map.

Exemplary applications/uses to which the present invention can be applied include, but are not limited to: self-driving vehicles, driving assisted vehicles, autonomous drones, automated mapping devices and mapping software and data.

It is to be understood that aspects of the present invention will be described in terms of a given illustrative architecture; however, other architectures, components, process features, and steps can be varied within the scope of aspects of the present invention.

Referring now to the drawings in which like numerals represent the same or similar elements and initially to FIG. 1, a perspective view of a plurality of guidance indicators on the road surface of a multi-lane road are shown, in accordance with an embodiment of the present invention.

In one or more embodiments, one or more guidance indicators 120 including a matrix bar code can be placed on a roadway surface 91 to specifically and accurately identify a location, for example, by latitude, longitude, altitude/elevation, etc., as well as orientation (e.g., facing/travelling north, south, east, west, gradient, etc.) relative to both local maps and global maps. The guidance indicator(s) 120 can also include a 3 dimensional (3D) affine transformation from a normalized size of the guidance indicator, where the 3D affine transformation can provide a reference for the facing/orientation of the guidance indicator, for example, the broader edge of the guidance indicator can identify a top edge and facing of the guidance indicator, and a perspective due to offset of the camera. The guidance indicators 120 can have an affine shape after undergoing an affine transformation. The Matrix used for the affine transformation can be encoded in the guidance indicators 120. A plurality of vehicles 110 can be on the roadway, where some or all of the vehicles 111 can have a camera and autonomous driving system.

The 3D affine transformation can allow a mapping and/or an autonomous driving/driving assistance system (referred to herein as an autonomous driving system for simplicity) to interpret changes in the shape of the guidance indicator 120 in the image(s) obtained by a camera in a vehicle 111 having a camera and autonomous driving system due to the perspective and motion of the camera, as adjustments in the vehicle's position, speed, and direction relative to the guidance indicator 120. For example, the image of a guidance indicator 120 may be skewed due to a change in the perspective of the camera if the vehicle 111 is shifted laterally from a head-on orientation from the guidance indicator, such change from a defined 3D affine transformation (i.e., expected image shape) can be used by a driving system or mapping system to determine that the vehicle is a distance to the left or right of the 3D affine transformed guidance indicator that can be calculated based on the difference in the shape of the observed image from the expected shape of the image, for example, using an ideal 3D model that can be generated using the affine transformation matrix encoded in the guidance indicator 120. In various embodiments, a detected shift in a vehicle's position relative to the guidance indicator can be used to adjust for lane drift, dangerous distances to a curb or pedestrian crossing, or realignment of the direction of travel for a road split or curve. The detection of an improper orientation of the guidance indicator can be used to identify an improper driving direction, for example, a wider top edge of the guidance indicator closer to the vehicle can be detected as a Wrong-Way driving condition, and a corrective maneuver and/or warning may be triggered by the autonomous driving system.

In one or more embodiments, use of the one or more guidance indicator(s) 120 can provide information accurate enough for an autonomous driving system to maintain a vehicle a safe distance from road-related features, for example, curbs, corners, and pedestrian crossings within a sufficient tolerance to avoid accidents, injuries, and damage to the vehicle. In various embodiments, a guidance indicator 120 with 3D affine transformation of the graphic can be generated and used with perspective warp to calculate the relative position between the vehicle 111 and the guidance indicator, and thus an absolute vehicle position relative to the guidance indicator and/or maps and the roadway. In various embodiments, the guidance indicator(s) 120 can provide information accurate enough for a self-driving system to identify a vehicle's relative position from the guidance indicator and absolute position on a roadway/map within a range of about 0.1 meter (m) to about 1 m with a predetermined confidence in the range of about 60% to about 75%, or about 65% to about 70%, or about 68%. Examples of precise navigation using the vehicle's relative position from a guidance indicator can include, entrance into the parking lot of a small store.

In one or more embodiments, the placement of the guidance indicator(s) 120 can be based on one or more road-related features that can invoke driving decisions based on the conveyed information, including: geometric features of the roadway, traffic control devices, and/or traveler accommodations. The guidance indicator(s) can be placed (e.g., painted, inlaid, affixed as a sign, etc.) on the roadway surface 91, itself, as a road surface marking, on a vertical surface adjacent to the roadway, or on a free-standing sign.

Geometric features of the roadway can be, for example, intersections (e.g., cross-roads (+roads), T-intersections, Y-intersections, etc.), junctions (e.g., sideroads, staggered sideroads, entering roadways/merges, highway/road splitting, interchanges, clover-leafs, traffic circles, etc.), ingresses, and egresses (e.g., on-ramps, off-ramps, parking lot entries, driveways, etc.), lane reductions/merges, downgrades, inclines, sharp curves, railroad crossings at grade, icy bridge surfaces, no-passing zones, flooding zones, pedestrian crossings, dropped curbs, etc.

Traffic control devices can be, for example, speed limit signs, traffic lights, stop signs, yield signs, merge signs, end-of-lane signs, one-way signs, do-not-enter signs, road surface markings, jersey barriers/barricades, etc.

Traveler accommodations can be, for example, gasoline filling stations, electric vehicle charging stations, rest-stops, hospitals, police stations, pharmacies, lodging, restaurants, truck parking, weigh stations, stores, handicap accessible facilities, scenic sites, tourist information sites, internet access/WiFi, etc.

Positioning of a vehicle 111 relative to a road-related feature (object) can involve detecting and identifying one or more guidance indicators 120 positioned on or adjacent to a roadway. In various embodiments, the guidance indicator(s) 120 can convey to a mapping system and/or an autonomous driving system the coordinates of the vehicle relative to the one or more geometric features of the roadway, traffic control devices, and/or traveler accommodations. In various embodiments, the guidance indicator(s) 120 can convey to an autonomous driving system the coordinates of the vehicle 111 relative to one or more road-related features, where the autonomous driving system can make driving decisions based on the conveyed information, for example, determining the correct radius of a turn to maintain tracking within a lane at an intersection, so as to not drift into oncoming vehicles or lanes, and to avoid any adjacent vehicles also making the turn (e.g., where there are two adjacent left turn lanes).

In various embodiments, the guidance indicator(s) 120 can convey to a road map system the coordinates of the vehicle 111 relative to one or more road-related features, where the road map system can make mapping and driving decisions based on the conveyed information, for example, identifying the position of a new road-related feature captured by the camera not previously encoded in a local or global map of the roadway being traversed by the vehicle (e.g., new side street or parking lot entrance at a new development, new traffic sign or stop light, etc.).

FIG. 1 illustrates a driving scenario 100, where a plurality of vehicles 110 are shown driving on a straight section of a four-lane road 90 with two lanes for each direction of traffic separated by a double yellow line 95. (Arrows indicate a direction of travel.) Four guidance indicators 120 are placed (e.g., painted) on the roadway surface 91, where a guidance indicator 120 is placed in each lane of the four-lane road 90. The four guidance indicators 120 can each include a matrix bar code modified by a 3D affine transformation to identify the latitude, longitude, and altitude/elevation specific for the lane the guidance indicator is in. Each of the four guidance indicators 120 can be used by vehicles 111 having an autonomous driving system to determine the precise location of the vehicle in relation to a global map, and a position on the roadway surface 91 relative to the guidance indicator(s) 120. Vehicles 111 driving on the roadway will maintain a position within a designated lane unless other conditions result in a lane change (e.g., passing another vehicle, leaving the roadway, etc.). Each vehicle 111 can determine whether the vehicle is within an intended lane based on the location and/or relative positioning. The autonomous driving system can adjust the vehicle's position to maintain it within a predetermined lane. The guidance indicators 120 can be aligned across the roadway or staggered, such that vehicles determine and adjust their positions at different times and locations.

Figure 2:
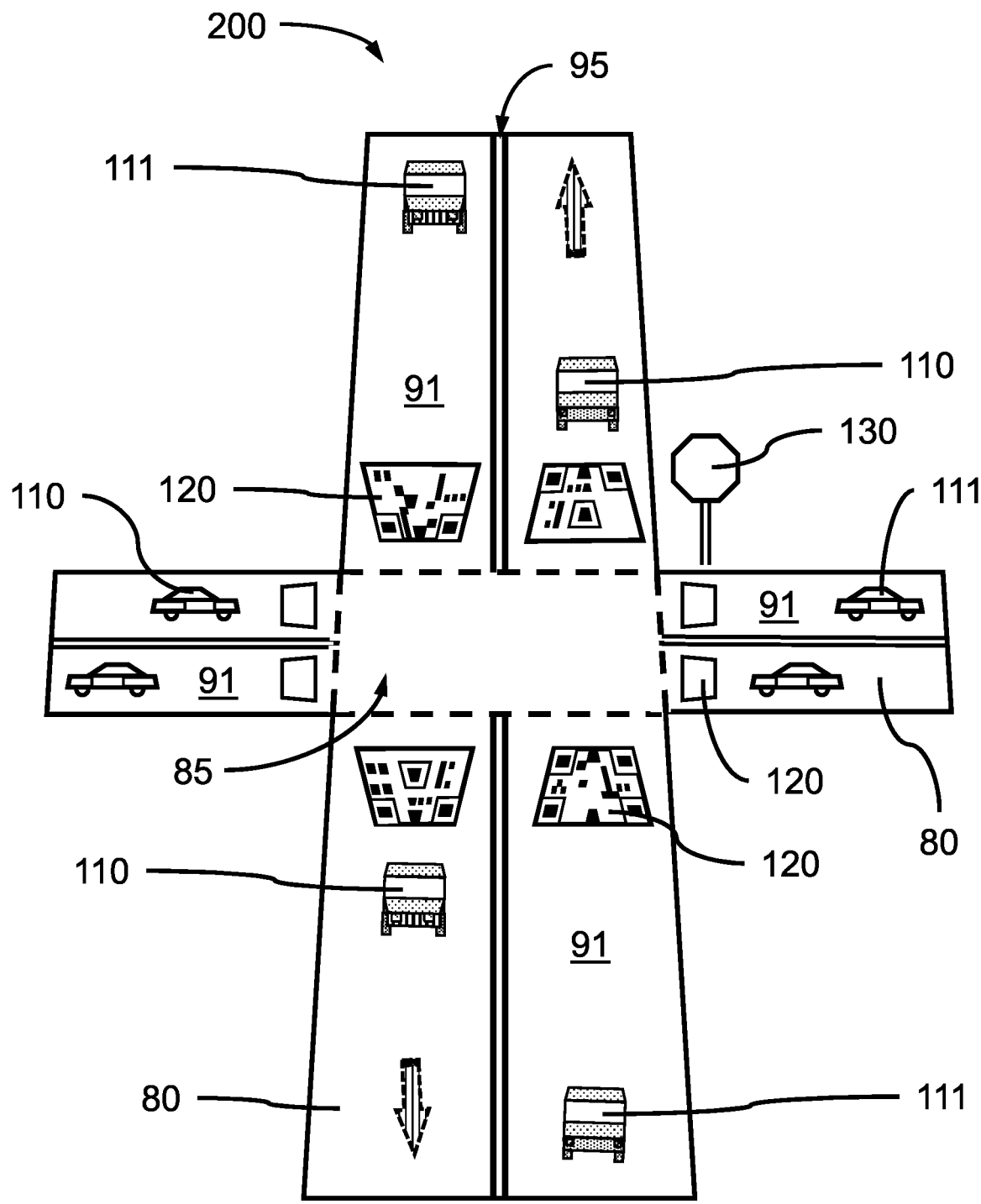
FIG. 2 is a perspective view showing a plurality of guidance indicators on the road surface at the road-related feature of an intersection of two two-lane roads, in accordance with an embodiment of the present invention.

FIG. 2 is a perspective view showing a plurality of guidance indicators on the road surface at the road-related feature of an intersection of two two-lane roads, in accordance with an embodiment of the present invention.

In one or more embodiments, one or more guidance indicators 120 can be positioned at or on a road-related feature to specify the location of the guidance indicators 120 and indicate the presence of a road-related feature that would involve the autonomous driving system in vehicles approaching the road-related feature to make driving decisions, for example, whether to stop, continue driving straight, make a left hand turn, or make a right hand turn.

FIG. 2 illustrates a driving scenario 200, where a plurality of vehicles 110 are shown driving on two two-lane roads 80 that meet at an intersection 85. The lanes for each direction of traffic are separated by a double yellow line 95. The guidance indicators 120 can be used by each of the vehicles 111 with an associated autonomous driving system to identify the position of the associated vehicle. The autonomous driving system can identify that the vehicle 111 is located at the intersection 85, which is controlled by traffic control devices 130 (e.g., stop sign(s)) based on semantic information contained within the guidance indicators 120 and/or the vehicle's autonomous driving system maps. In one or more embodiments, one or more guidance indicators 120 including a matrix bar code can be placed on a traffic control device 130. The autonomous driving system can determine that vehicles 111 approaching from a predetermined direction must come to a full stop before entering the intersection, whereas vehicles entering the intersection from the transverse direction can pass through based on the semantic information and the location and orientation of the vehicle. A vehicle 111 making a turn can identify the lane the vehicle is in, the vehicle's position relative to adjacent curbs, and the distance to the intersecting lane that the vehicle intends to turn on to based on the guidance indicators 120. Each of these road-related features involve driving decisions to be made the an autonomous driving system.

Figure 3:
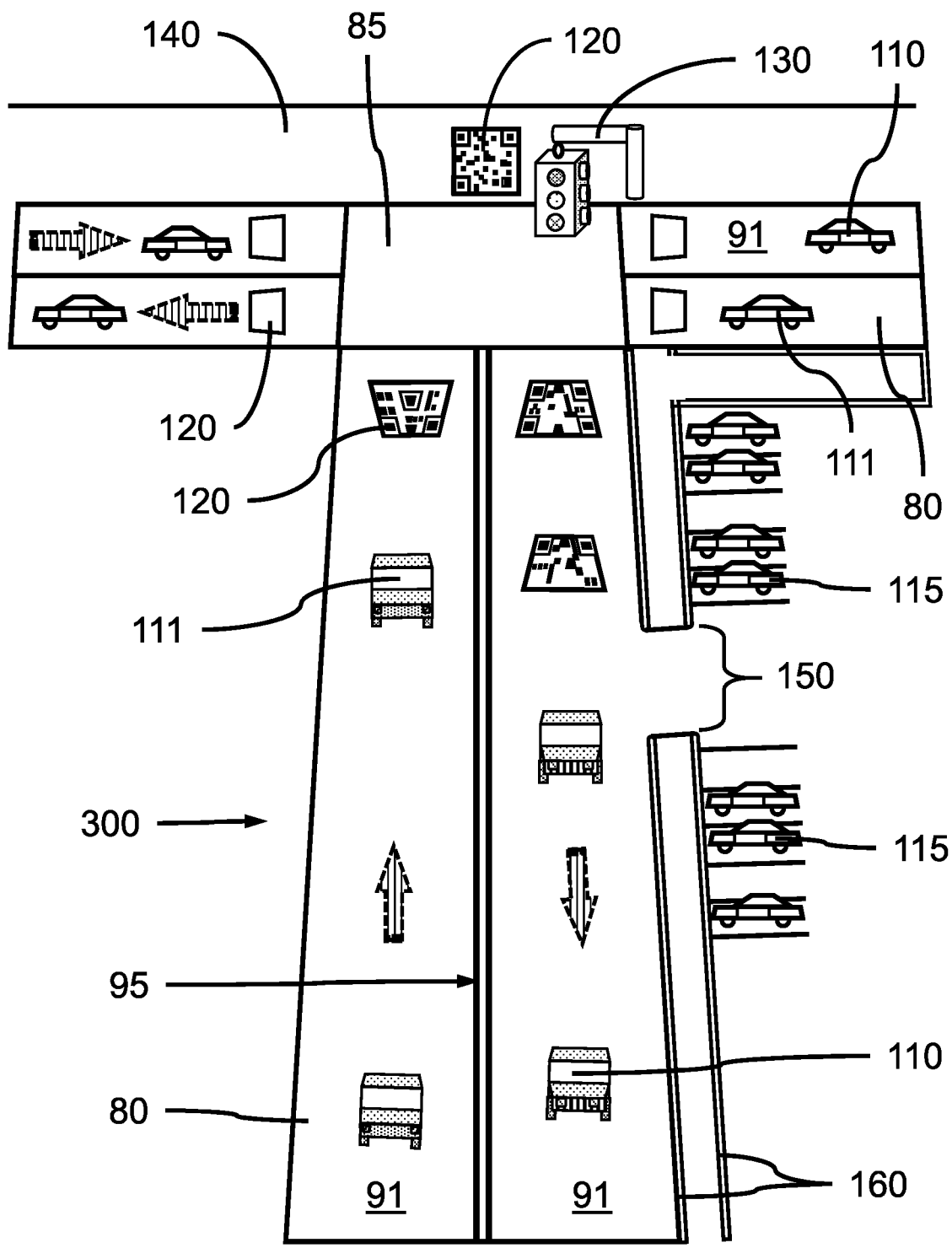
FIG. 3 is a perspective view showing a plurality of guidance indicators on the road surface of a two lane road having the road-related feature of a T-intersection with a road-related feature of a traffic control device, in accordance with an embodiment of the present invention.

FIG. 3 is a perspective view showing a plurality of guidance indicators on the road surface of a two lane road having the road-related feature of a T-intersection and a road-related feature of a traffic control device, in accordance with an embodiment of the present invention.

In one or more embodiments, one or more guidance indicators 120 including a matrix bar code can be placed on vertical surfaces 140 adjacent to a roadway, where the guidance indicator(s) can provide additional position and semantic information to a mapping and/or an autonomous driving system. In various embodiments, a guidance indicator 120 can be placed on a vertical surface 140, for example, a wall, a bridge embankment, a roadway divider, or a sign, where the guidance indicator can provide position and/or be combined with an HD(SD) map to obtain navigational information for vehicles approaching the vertical surface 140, for example, bridge clearance height, blind curves, hidden traffic ingress or egress, sudden stops, right-of-way, do-not-enter/one-way traffic controls, etc. In various embodiments, a QR code graphic can provide the absolute position of the vehicle 111, and the absolute position of the vehicle can find 3D model information of arbitrary objects provided in a HD(SD) map.

In various embodiments, the autonomous driving system can identify that the vehicle 111 is located at the intersection 85, which is controlled by traffic control devices 130 (e.g., stop light(s)) based on semantic information contained in the vehicle's autonomous driving system maps, where the relative position of the traffic control device(s) 130 to the vehicle 111 can be resolved using the guidance indicators 120.

In various embodiments, guidance indicators 120 can be placed at ingress/egress locations 150 for features, such as parking lots and commercial driveways, where the guidance indicators 120 can provide the location and additional information such as the size and use of the driveway. The additional semantic information can assist the autonomous driving system to avoid hazards, such as parked vehicles 115 and curbs 160.

FIG. 3 illustrates a driving scenario 300, where a plurality of vehicles 110 are shown driving on two two-lane roads 80, where there is a stop-light 130 and an entry 150 into a parking lot. A vehicle 111 can make decisions regarding making a left or right turn at the wall 140 having the guidance indicator 120, or at the entrance 150 to the parking lot.

Figure 4:
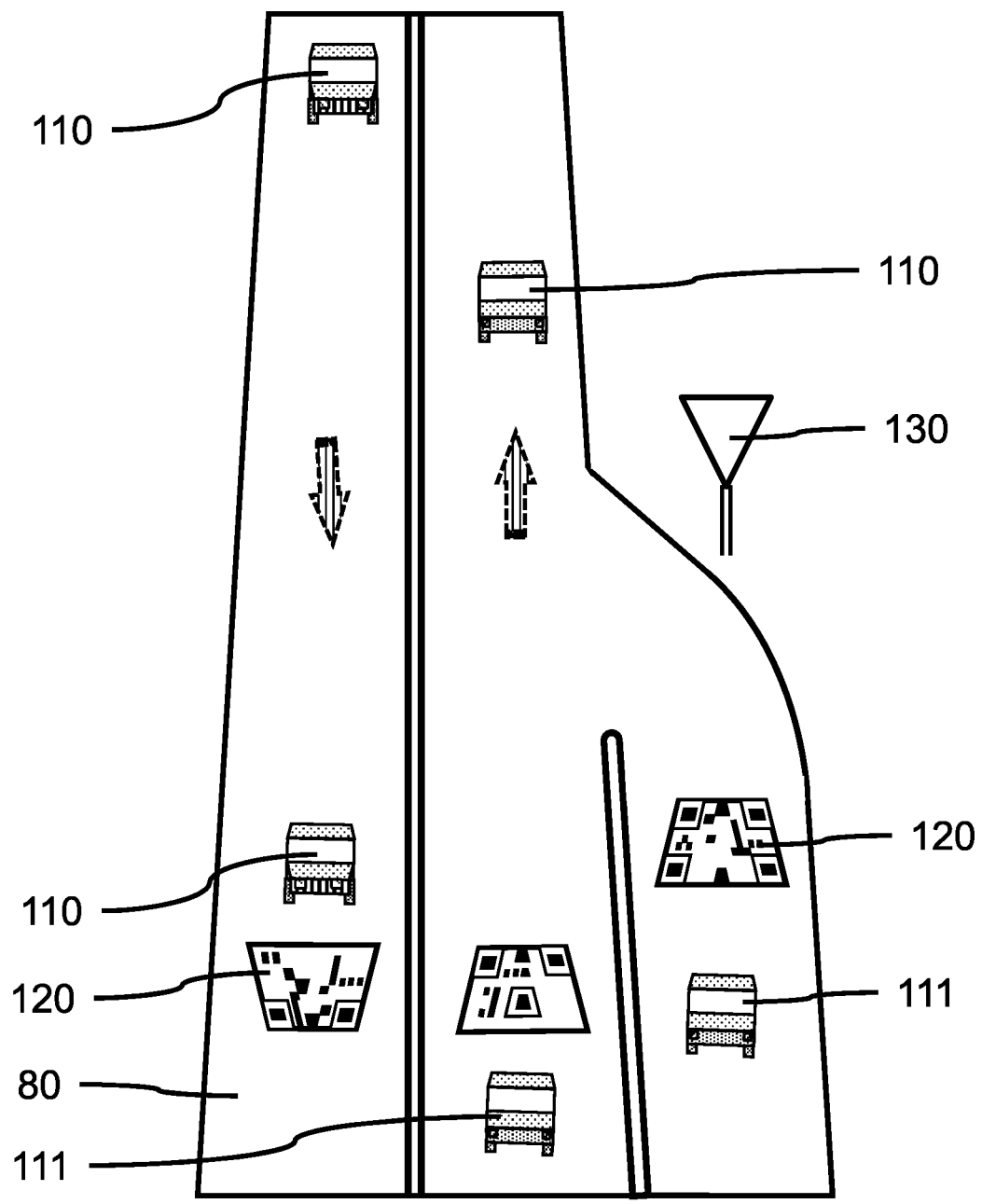
FIG. 4 is a perspective view showing a plurality of guidance indicators on the road surface of a single lane road having the road-related feature of an on-ramp, in accordance with an embodiment of the present invention.

FIG. 4 is a perspective view showing a plurality of guidance indicators on the road surface of a single lane road having the road-related feature of an on-ramp, in accordance with an embodiment of the present invention.

In one or more embodiments, a guidance indicator 120 can be placed on an on-ramp or off-ramp to identify a location involving a change of speed and/or a merging maneuver for the vehicle 111. Other guidance indicators 120 can be placed on the roadway surface to inform vehicles that merging traffic may be approaching at a predetermined distance from the current position of the vehicle. A traffic control devices 130 (e.g., merge or yield sign) can be placed along an on-ramp, and detected as a landmark by a camera in the vehicle 111.

Figure 5:
FIG. 5 is a view of an example of a matrix bar code used for a guidance indicator, in accordance with an embodiment of the present invention.

FIG. 5 is a view of an example of a matrix bar code used for a guidance indicator, in accordance with an embodiment of the present invention.

In one or more embodiments, the guidance indicator 120 can be a matrix bar code that can be a quick response code (QR Code®), an Aztec code, a data matrix, a Han Xin barcode, or other such two-dimensional barcodes that can encode the particular information. The barcode is a machine-readable optical label that can contain information about the location to which it is attached. The data can be extracted by an autonomous driving system from the patterns that are present as both horizontal and vertical components of the image captured by a camera.

In various embodiments, the guidance indicator 120 can include the coordinates of the guidance indicator as latitude, longitude, and altitude/elevation, where the coordinates can be, for example, to four decimal places, five decimal places, or six decimal places depending on the accuracy needed. The guidance indicator 120 can also include an orientation, for example, [2.0, 3.0, 0] and/or a transformation, for example, [1,0,0,0,0,1,0,0,0,0,1,0,0,0,0,0], where the values can be coordinates, a vector, or matrix values. The guidance indicator 120 can also include a scale value, for example, [1.5]. The guidance indicator 120 can also include a provider identifier and/or a signature code to identify the source and/or the authenticity of the guidance indicator 120.

In a non-limiting exemplary embodiment, the guidance indicator 120 can be a QR code that can encode information such as: {"coordinates": [139.287014,35.300877,3.23223] "facing": [2.2,0.01,23.23] }.

In various embodiments, the guidance indicator can have dimensions sufficient for a camera with a predetermined resolution to accurately capture a readable image at a predetermined distance from the guidance indicator. In various embodiments, the guidance indicator can have dimensions before an affine transformation of about 5 centimeters (cm) to about 50 meters (m) square, or about 0.1 m to about 10 m square, about 1 meter by 1 meter square, although other sizes both larger and smaller are contemplated. Difficult to navigate road-related features may have larger guidance indicators to provide greater sight distance and thereby increased time for a self-driving system to detect, identify, and take appropriate action based on the guidance indicator through safe navigation (e.g., realignment and/or reorientation of the vehicle on the roadway) and maneuvering (e.g., lane shifts, activation of brakes and/or turn signals, etc.) of the vehicle. A non-standard shape represented by various specifiable transformation(s), such as affine transformations specified as 4×4 matrices, can be generated for the graphic that can alter the initial dimensions.

Figure 6:
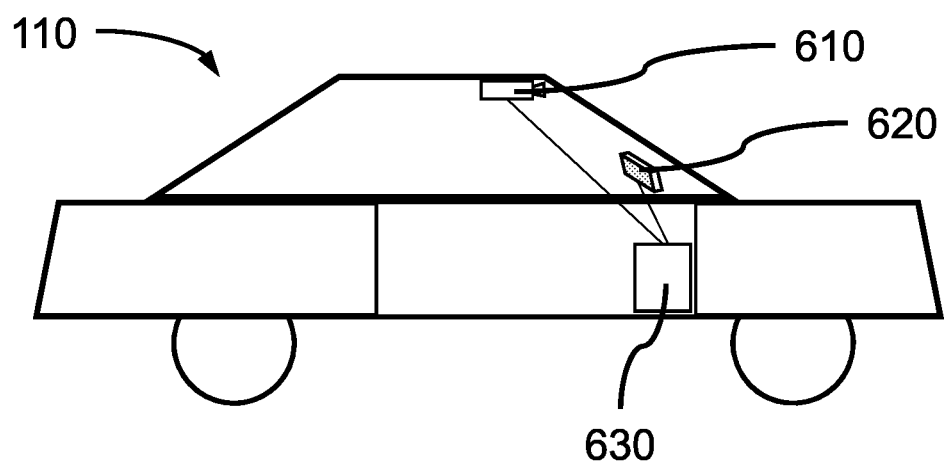
FIG. 6 is side view showing a vehicle having a camera, a Global Positioning System (GPS)/Inertial Measurement Unit (IMU)/Controller Area Network (CAN bus) and an in-vehicle computing device, in accordance with an embodiment of the present invention.

FIG. 6 is side view showing a vehicle having a camera, a Global Positioning System (GPS)/Inertial Measurement Unit (IMU)/Controller Area Network (CAN bus) and an in-vehicle computing device, in accordance with an embodiment of the present invention.

In one or more embodiments, a camera 610, which can be a digital high resolution video camera, can be mounted within a vehicle 110, where the camera 610 can have an unobstructed view out of the vehicle from the mounting position. The view of the camera 610 can be towards the direction of travel of the vehicle, so the camera can observe guidance indicators 120 approaching the vehicle. In various embodiments, sensors can be mounted around a vehicle's rooftop to provide unobstructed 360 degree viewing of a roadway and terrain. Sensors can include cameras, LiDAR, GPS, IMU, and radars.

In various embodiments, the camera 610 can be a high resolution digital video camera having a resolution, for example, of 1280×720 pixels for 720p resolution; 1920×1080 pixels for 1080p; or 3840×2160 pixels for 4K resolution. The digital video camera can be a color camera (e.g., RGB), a low light camera, a high speed camera (e.g., frame rates in excess of 250 frames per second), or a combination thereof. Higher speed and higher resolution cameras are also contemplated. In various embodiments, high resolution cameras can be used for image capture, and the images filtered and analyzed.

In one or more embodiments, a road map system can include a camera 610 and an autonomous driving system 630, where the camera 610 can be coupled to and in electronic communication with an autonomous driving system 630 including an in-vehicle computing device having a central processing unit (CPU) and memory. The autonomous driving system 630 and camera 610 can search for guidance indicators 120 in captured images to resolve the absolute positions of the 3D models its sensors and cameras detected. The autonomous driving system can also include a Global Positioning System (GPS)/Inertial Measurement Unit (IMU)/Controller Area Network (CAN bus) for interaction with global and/or local maps. Maps and instructions can be output to a display 620 that can present driving conditions and navigation information. A controller area network (CAN) is a vehicle bus standard designed to allow microcontrollers and devices to communicate with each other in applications without a host computer.

Figure 7:
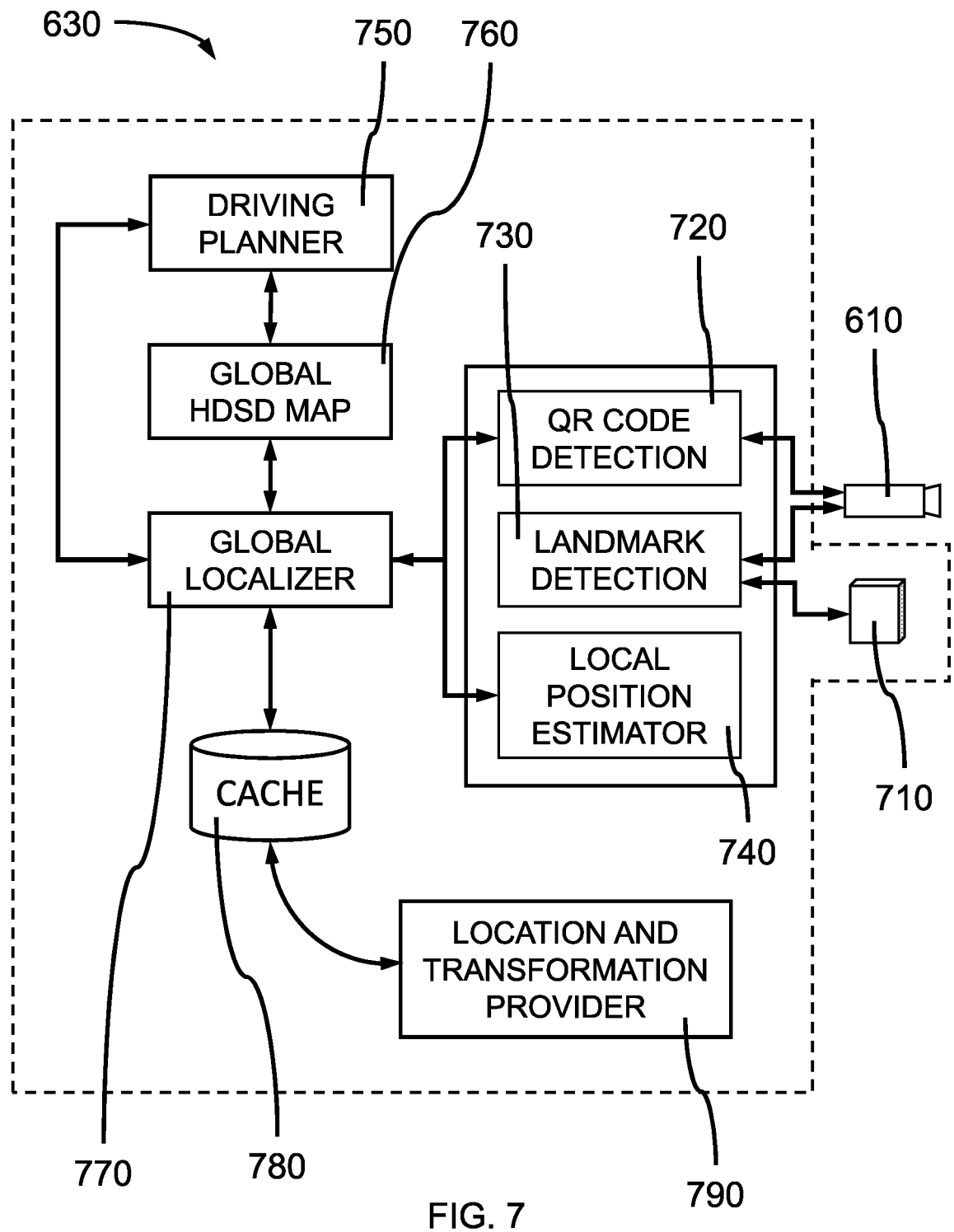
FIG. 7 is a block diagram of the system architecture for a map-using vehicle, in accordance with an embodiment of the present invention.

FIG. 7 is a block diagram of the system architecture for a map-using vehicle, in accordance with an embodiment of the present invention.

In one or more embodiments, a map-using vehicle can include an autonomous driving system 630 with a Global Positioning System (GPS)/Inertial Measurement Unit (IMU)/Controller Area Network (CAN bus) 710 and a camera 610. The autonomous driving system 630 can include a guidance indicator (e.g., QR code) detector 720, a landmark detector 730, and a local position estimator 740.

In various embodiments, the guidance indicator detector 720 can search for any QR code in the captured camera images according to the QR code specification. A neural network can be used to identify and decode the QR code.

In various embodiments, the landmark detector 730 searches for potentially useful visual feature points (e.g., environmental landmarks) in camera images and tracks through multiple images.

In various embodiments, the local position estimator 740 does Visual SLAM (estimating relative positions of the beforementioned environmental landmarks moving according to the movement of the vehicle, as well as estimating relative positions of the vehicle to the landmarks).

In various embodiments, the autonomous driving system 630 can include a driving planner 750, a global HDSD map 760, and a global localizer 770, as well as a cache memory 780 for storage.

In one or more embodiments, the driving planner 750:
1) uses the absolute position of the vehicle obtained from a global localizer 770 and the environmental objects (speed-regulated road lanes, traffic signs and signals, hazards, etc.) specified with their absolute position in a global HDSD map 760,
2) recognizes the relative positions of the environmental objects, and
3) decides how to drive with the given environmental condition(s) (e.g. avoiding public vehicle-dedicated lanes, risky curbs, etc.) and original driving objectives (i.e. passenger-specified goal and checkpoints, and derived sub-goals). In various embodiments, the driving planner 750 can perform additional image reasoning tasks to detect traffic signs and signals of interest in camera images, by knowing which environmental traffic signs and signals to obey according to information from the global HDSD map.

In various embodiments, the autonomous driving system 630 can be coupled to and in electronic communication with a location and transformation provider 790 to obtain the up-to-date absolute position and shape of a guidance indicator (e.g., QR code) graphic, rather than an obsolete position and shape of the graphic encoded in the guidance indicator (e.g., QR code) based on the identifier encoded in the guidance indicator.

Figure 8:
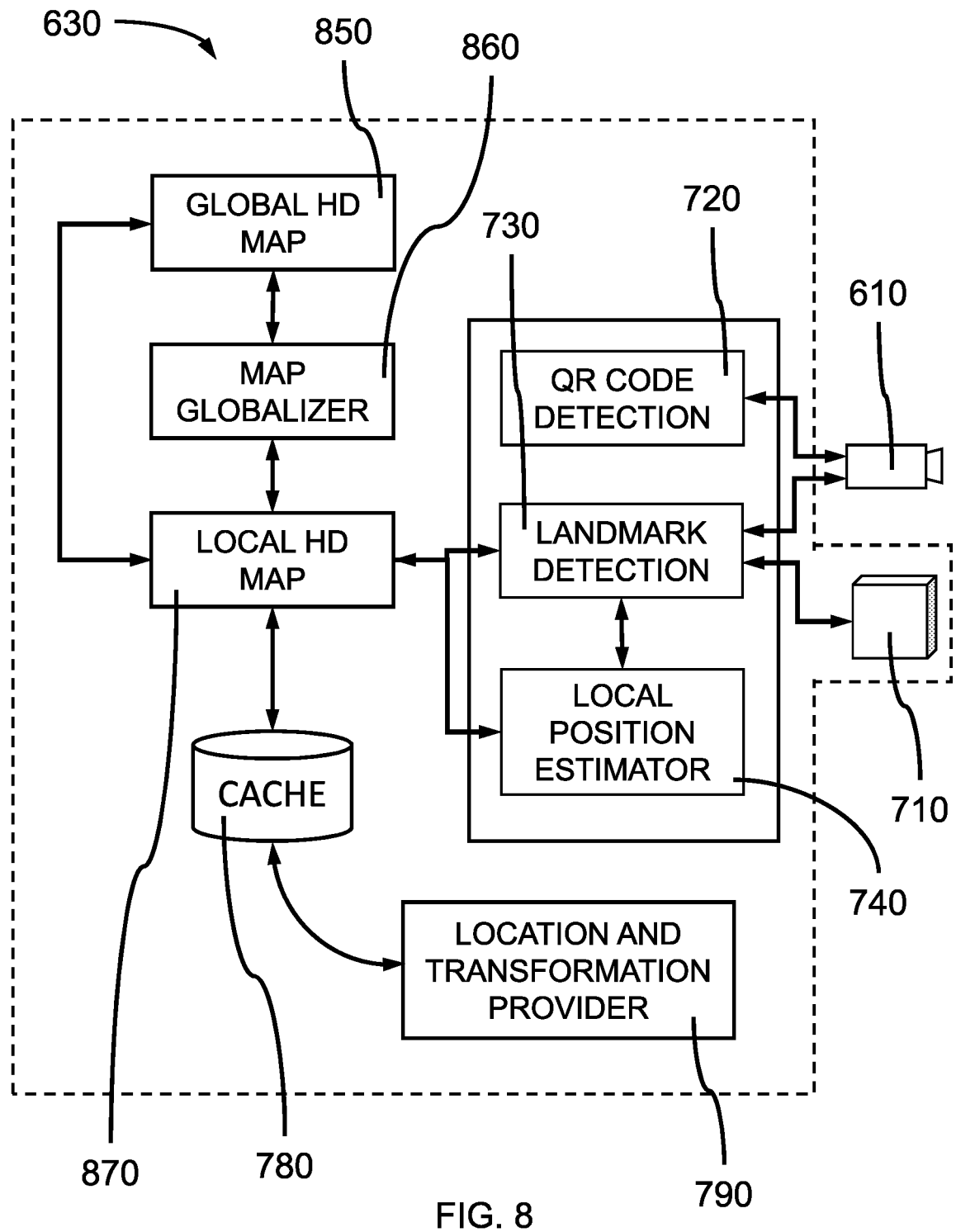
FIG. 8 is a block diagram of the system architecture for a map-generating vehicle, in accordance with an embodiment of the present invention.

FIG. 8 is a block diagram of the system architecture for a map-generating vehicle, in accordance with an embodiment of the present invention.

In one or more embodiments, the autonomous driving system 630 can include a global HD map 850, a map globalizer 860, and a local HD map 870, as well as a cache memory 780 for storage.

In various embodiments, a global HD map 850 can contain the absolute positions of the guidance indicators 120 and detected landmarks.

In one or more embodiments, the map globalizer 860:
1) receives, from a guidance indicator detector 720, the encoded absolute position of the corresponding 3D model of a guidance indicator graphic and its relative position to the vehicle utilizing the camera for detection, to calculate and determine the absolute position of the vehicle;
2) converts the local positions in the local HD map 870 to the global positions, thereby pinning a corresponding position in the local HD map to the global HD map 850; and
3) stores the road-related features (e.g., landmarks) with global positions in the global HD map 850, where the global HD map 850 can include such road-related features (e.g., landmarks).

In various embodiments, a map globalizer 860 can correct the 3D model of a guidance indicator graphic using the up-to-date location and transformation obtained from a location and transformation provider 790, by querying an identifier encoded in the QR code.

In one or more embodiments, the local HD map 870 contains the local positions (relative to a position of a vehicle at a certain time) of detected road-related features (e.g., landmarks).

Figure 9:
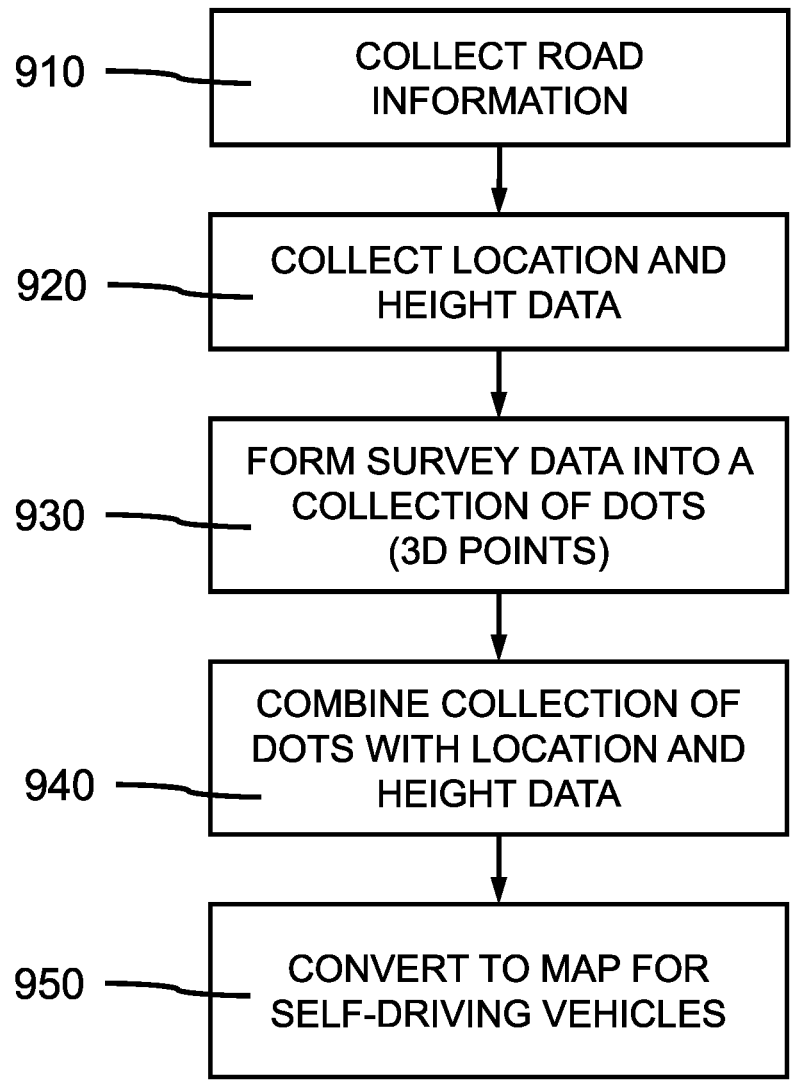
FIG. 9 is a block/flow diagram of a method of forming maps for self-driving vehicles, in accordance with an embodiment of the present invention.

FIG. 9 is a block/flow diagram of a method of forming maps for self-driving vehicles, in accordance with an embodiment of the present invention.

In block 910, an autonomous driving system associated with a vehicle can detect and collect road-related features (objects), including, but not limited to, traffic control devices 130 (e.g., traffic lights, traffic signs, geographic features, etc.) captured in camera images and/or using other sensors (e.g., light imaging, detection, and ranging (LiDAR)).

In block 920, the autonomous driving system can collect an absolute position of the associated vehicle using guidance indicator detector 720 and a local position estimator 740.

In block 930, the autonomous driving system can form 3D models (such as 3D points) of the road related features collected in block 910 using sensors.

In block 940, the autonomous driving system can combine the captured 3D models and absolute position of the associated vehicle to place the vehicle within a 3D map. The position can include both location and height/altitude data of the vehicle/autonomous driving system.

In block 950, the autonomous driving system can convert the 3D models with absolute positions combined in block 940 to a 3D map for the self-driving vehicles.

In various embodiments, the 3D map can be updated with semantic information manually and/or automatically added based on the original image and detected 3D models. Guidance indicators can trigger retrieval of the semantic information about the road-related features.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A visual localization support system, comprising:
one or more guidance indicators placed on a road surface of a roadway, wherein the one or more guidance indicators each include a matrix barcode that,
uniquely identifies a location of the road surface on which it was placed by latitude, longitude, and altitude, and
describes an affine shape of the guidance indicator.

2. The visual localization support system of claim 1, wherein each of the one or more guidance indicators further includes a 3D affine transformation matrix.

3. The visual localization support system of claim 1, wherein each of the one or more guidance indicators further includes a provider identifier and/or a signature code.

4. The visual localization support system of claim 1, wherein the matrix barcode is chosen from the group consisting of quick response code (QR Code®), an Aztec code, a data matrix, and a Han Xin barcode.

5. The visual localization support system of claim 1, wherein the one or more guidance indicators have a size in the range of about 5 cm to about 50 m.

6. The visual localization support system of claim 1, wherein the one or more guidance indicators are placed on the road surface at one or more road-related features that can invoke driving decisions based on the conveyed information.

7. The visual localization support system of claim 6, wherein the road-related features are selected from the group consisting of geometric features of the roadway, traffic control devices, and traveler accommodations.

8. The visual localization support system of claim 7, wherein at least one of the one or more guidance indicators triggers retrieval of semantic information about the road-related features.

9. The visual localization support system of claim 1, further comprising one or more guidance indicators placed on a vertical surface adjacent to the roadway.

10. A method of forming a visual localization support system, comprising:
placing one or more guidance indicators on a road surface, wherein each of the one or more guidance indicators includes a matrix barcode that uniquely identify a location by latitude, longitude, and altitude, of the road surface on which it was placed, and describes an affine shape of the guidance indicator.

11. The method of claim 10, wherein the one or more guidance indicators are placed at one or more road-related features that can invoke driving decisions based on the conveyed information.

12. The method of claim 10, wherein the one or more guidance indicators are placed on the road surface by painting.

13. The method of claim 10, further comprising placing one or more guidance indicators on a vertical surface adjacent to the roadway.

14. The method of claim 10, wherein the matrix barcode is chosen from the group consisting of quick response code (QR Code®), an Aztec code, a data matrix, and a Han Xin barcode.

15. The method of claim 10, wherein the one or more guidance indicators convey semantic information about the road-related objects.

* * * * *